United States Patent [19]

Schaefer

[11] 4,325,414

[45] Apr. 20, 1982

[54] HOLLOW BODY ASSEMBLIES

[76] Inventor: Rudolf Schaefer, Brauerstrasse 35, D-4100 Duisburg 1, Fed. Rep. of Germany

[21] Appl. No.: 166,562

[22] Filed: Jul. 7, 1980

[30] Foreign Application Priority Data

Jul. 4, 1979 [DE] Fed. Rep. of Germany ....... 2927040

[51] Int. Cl.³ .............................................. F16L 9/22
[52] U.S. Cl. .................................. 138/155; 138/120; 138/109; 138/162; 285/365; 285/405
[58] Field of Search ............... 138/109, 120, 155, 162, 138/166, 178; 285/405, 407, 331, 365, 31

[56] References Cited

FOREIGN PATENT DOCUMENTS

| 261505 | 1/1964 | Australia | 138/109 |
|---|---|---|---|
| 2641504 | 3/1978 | Fed. Rep. of Germany | 138/120 |
| 1239174 | 11/1958 | France | 138/109 |
| 952755 | 3/1964 | United Kingdom | 285/365 |

Primary Examiner—James E. Bryant, III
Attorney, Agent, or Firm—Spencer & Kaye

[57] ABSTRACT

A hollow body assembly wherein a circumferential flange is disposed on the outside and/or inside of each of a pair of individual elements to be connected at their connecting surfaces. Each of the flanges has a transverse outer surface which is perpendicular to the longitudinal axis of its respective individual element and an inner surface which is oblique to the transverse direction of the outer surface. A circumferential ring having an inner channel surrounds the flanges when the elements are connected, the ring having side edges for gripping the oblique surfaces of the flanges. The distance between the side edges of the ring when it is in its unstressed condition is less than the distance between the base points of the oblique surfaces of the flanges.

19 Claims, 11 Drawing Figures

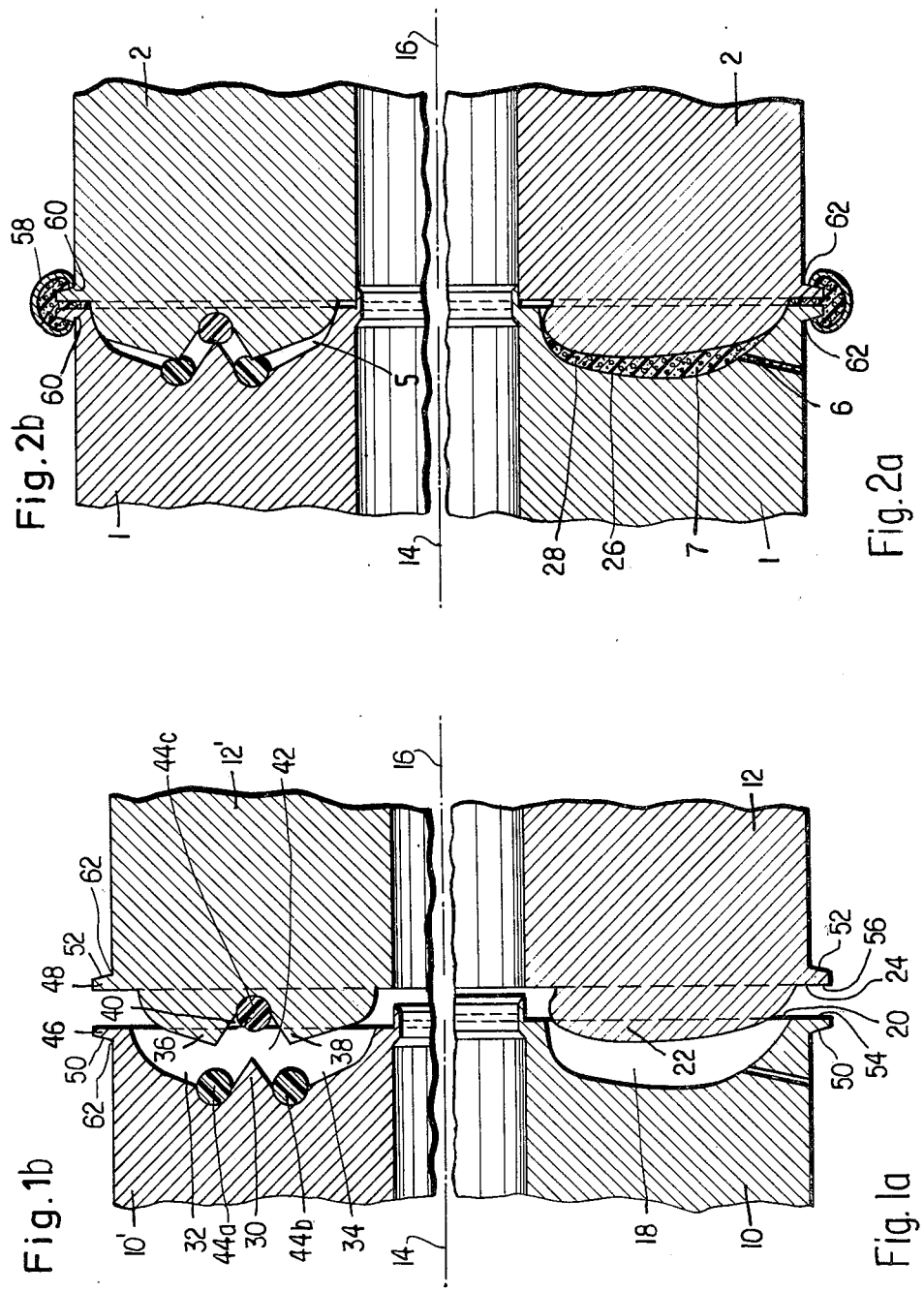

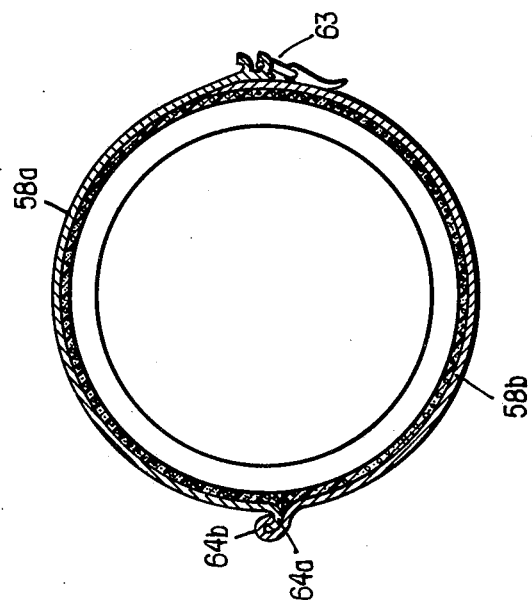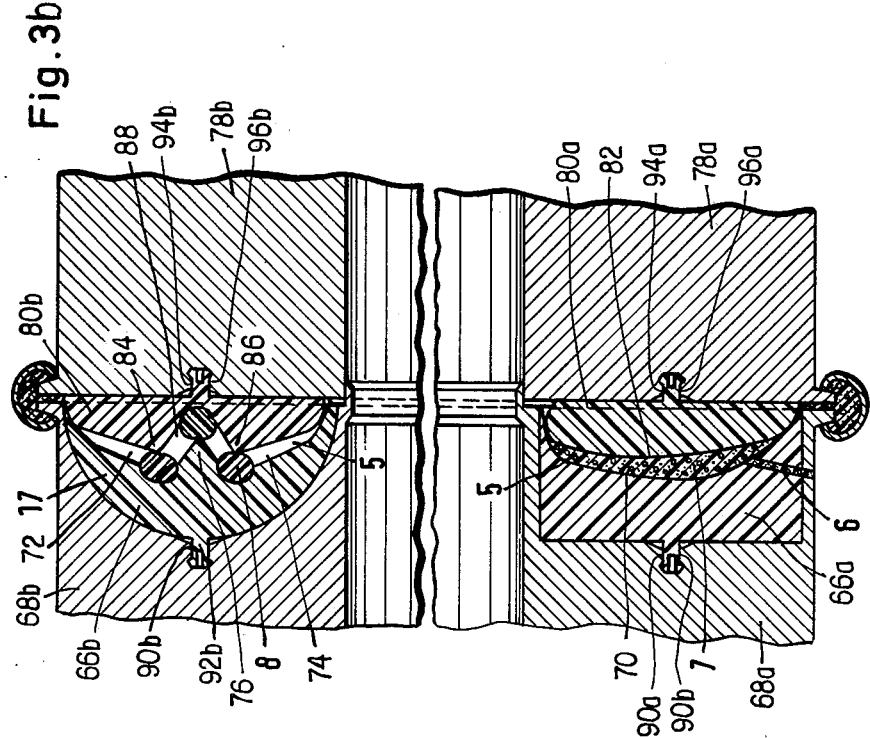

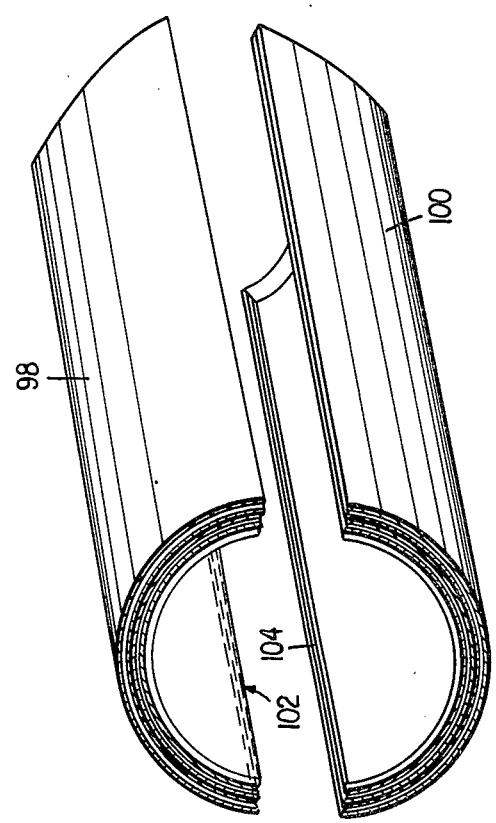
Fig. 6
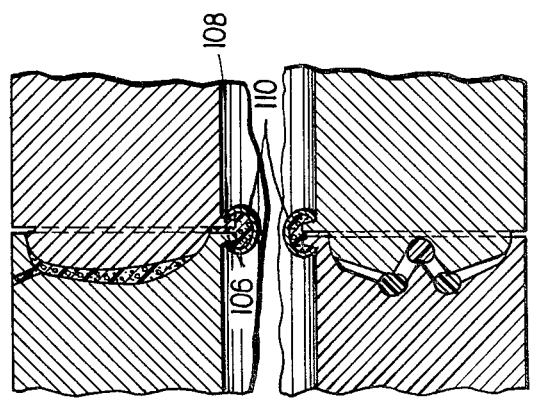
Fig. 5a
Fig. 5b

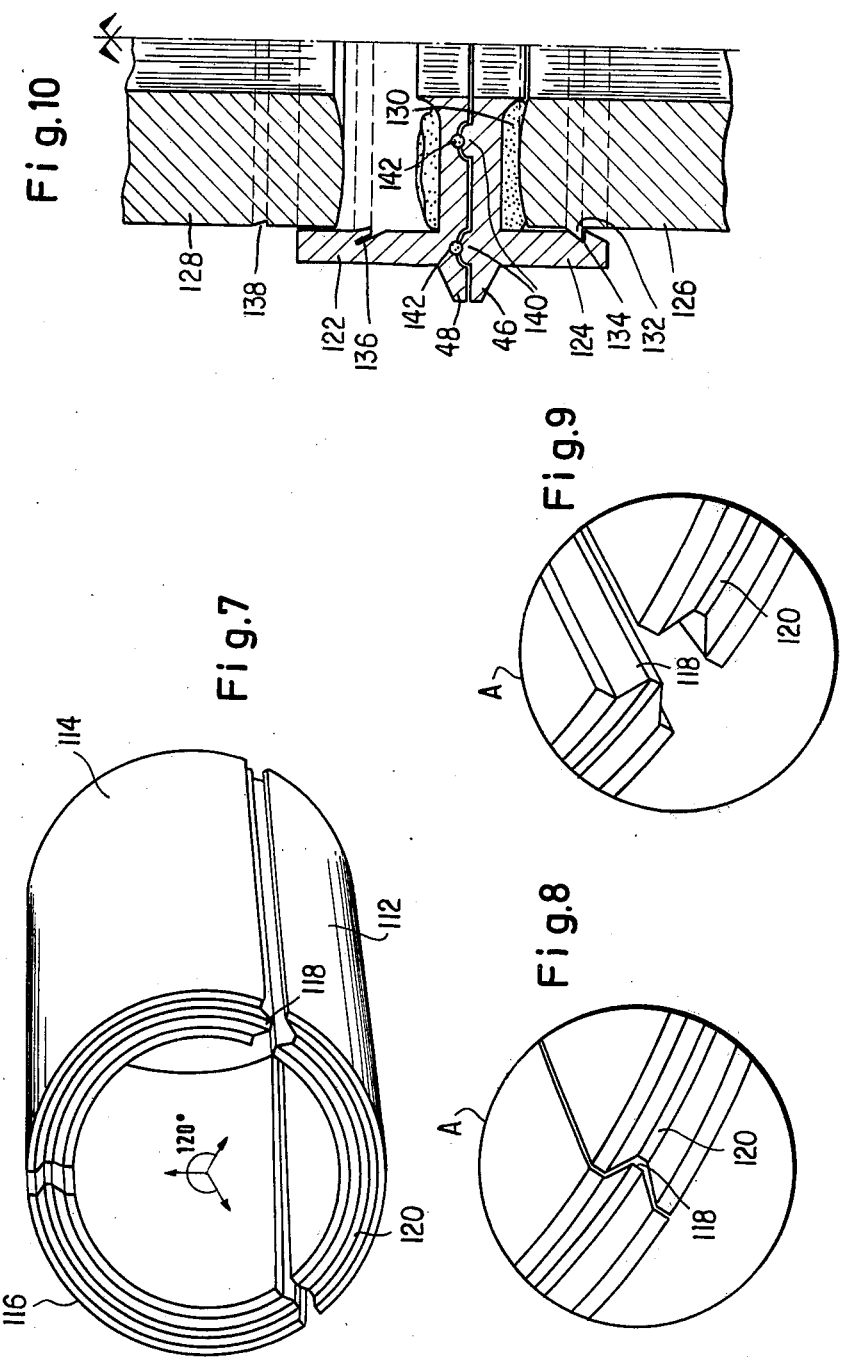

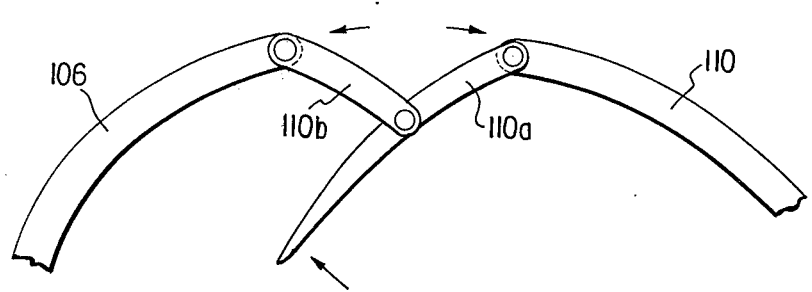
Fig. II

HOLLOW BODY ASSEMBLIES

BACKGROUND OF THE INVENTION

This invention relates to a hollow body assembly, such as a tube or tunnel, which is composed of individual elements having mating tongue and groove connections in their front connecting surfaces. An annular cavity is formed between the tongue and the surface of the groove, the axial distance between the tongue and the surface of the groove being greater near the center of the tongue than at its edges.

Such a hollow body assembly is known from European Offenlegungsschrift No. 1 836. In this known hollow body assembly the pressure to force the elements one against the other is produced by a clamping band positioned at right angles to the connecting surfaces and parallel to the pressure forces, and which encompasses the entire assembly. In the case of relatively long hollow body assemblies, a greater length of band must be provided and, in the case of pipes or tunnels, it is not possible to encompass the hollow body longitudinally. Moreover, this known connection permits only a very restricted degree of movability of the elements with respect to each other.

An object of the invention is to improve the joining of individual elements which make up a hollow body in such a way that clamping devices which are short in length and small in size are sufficient. Furthermore, it is an object of the invention to improve elements of the above-mentioned type in such a way that they have a large degree of mobility in relation to one another as well as being of the simplest construction and having a high degree of tightness.

SUMMARY OF THE INVENTION

These objects are achieved by the present invention wherein a circumferential flange is disposed on the outside and/or inside of each of the individual elements to be connected at their connecting surface. Each of the flanges has a transverse outer surface which is perpendicular to the longitudinal axis of its respective individual element and an inner surface which is oblique to the transverse direction of the outer surface. A circumferential ring having an inner channel surrounds the flanges when the elements are connected, the ring having side edges for gripping the oblique surface of the flanges. The distance between the side edges of the ring when it is in its unstressed condition is less than the distance between the base points of the oblique surfaces of the flanges.

The clamping band in the form of a circumferential ring is secured directly at the connection between the individual elements and, with its small outer dimensions and length, produces sufficient pressure on the oblique surfaces of the flange to hold the front sides of the elements together. This method of fastening is inexpensive due to the low cost of construction and ease of handling. A high degree of tightness is achieved in that the ring has a sealing effect which supplements the seal provided by the tongue and groove. Further, the combination of the flexible ring and tongue and groove results in a construction in which the elements have a high degree of mobility with respect to each other. In particular, in the case of pipes, the ring can abut the outer sides of the hollow bodies and be tightened by a clamping device which is easily reached from the outside.

Pipe connections with the following features are provided by the present invention:
1. The connections can be made by unskilled workers as often as desired without noticeable abrasion;
2. The connections provide absolute sealing against gas, vacuum and water pressure;
3. The connections permit the pipes to center themselves relative to one another when joined;
4. The connections remain flexible without impairing the sealing at the connecting points;
5. The connections permit the collar part to be mounted simply, securely and tightly.

In addition or alternatively thereto, when inner flanges are employed, the ring can also abut the inner sides of the hollow bodies and be expanded by a pressure device. This is especially of interest in tunnel construction.

In a preferred form of the invention, the ring is divided into two or more parts and the parts are secured to each other by means of hooks. Consequently, the ring is easy to maintain and requires little storage space prior to assembly. It can also be easily introduced into the inside of a tunnel. After the ring is brought into abutment, its tightness and holding function are improved by filling the inner hollow area of the ring with a mass which hardens. Alternatively, the mass can be permanently elastic. If a permanently elastic mass is selected, a high degree of movability of the elements with respect to each other is maintained.

A high degree of movability of the elements with respect to each other combined with sufficient tightness is achieved in that, when the hollow body is assembled, there is at least one hollow volume or cavity between the tongue and the groove which can be filled by a mass which hardens and/or is permanently elastic, or into which at least one elastic clamping band can be inserted. Also, an elastic clamping band can be placed at the base of each groove at which the back of the tongue comes into abutment.

The tongue and/or groove may have profile members which are inserted or attached at the front sides of the included pipe elements. A high degree of accuracy in production of the connecting points as well as simplification in the construction of the elements is thereby achieved since the elements themselves do not require precisely constructed grooves or tongues which are matched to the corresponding groove or tongue of the other element. The profile portions can be secured with particular ease at the front sides of the elements by a tongue and groove arrangement, and can be composed of elastic material which makes them easy to produce and permits a high degree of tightness to be attained.

In the case of larger hollow bodies, such as for example a tunnel, the elements are particularly easy to transport, store and use if they are composed of several shells, in particular half shells. Continuous groove and tongue connections are achieved even in corner areas in that in the corners of the shells, the tongue of one front surface passes into a groove of a dividing surface and the groove of one front surface passes into a tongue of a dividing surface. Not only is the tightness improved thereby, but also the transition between the grooves and tongues is continuous without being changed after the shells have been assembled at the front sides of the elements. Preferably, these transition points make an angle of 45° with the grooves and tongues. An increase in stability is achieved when using shells by assembling the elements in such a way that the dividing joints of one element are staggered in relation to those of the abutting element.

BRIEF DESCRIPTION OF THE DRAWINGS

FIGS. 1a and 1b show longitudinal cross sections through the connecting points of two spaced tube elements, a first embodiment being shown in FIG. 1a and a second embodiment in FIG. 1b.

FIGS. 2a and 2b show the sections according to FIGS. 1a and 1b, respectively, wherein the elements are assembled together with a mounted ring.

FIGS. 3a and 3b show a section corresponding to FIGS. 2a and 2b, respectively, wherein tongues and grooves are formed by profile members affixed to the elements.

FIG. 4 shows a transverse cross section through a tube having a mounted ring and clamping device.

FIGS. 5a and 5b show longitudinal cross section through two embodiments of the invention, each tube having an inner ring.

FIG. 6 shows a perspective view of a tube formed from two half shells.

FIG. 7 shows a perspective view of a tube formed from three half shells.

FIGS. 8 and 9 are detailed illustrations of a section A of the tube of FIG. 7 when assembled and taken apart, respectively.

FIG. 10 illustrates the left half of a section cut through two tubes secured to one another with fixing rings mounted on the front side of the tubes.

FIG. 11 shows a ring expansion device.

DETAILED DESCRIPTION OF THE PREFERRED EMBODIMENTS

Referring to FIGS. 1a and 2a, there is shown tube sections 10 and 12 having longitudinal axes 14 and 16, respectively. An arched annular groove 18 is located in the connecting or outer surface 20 of tube section 10 and a mating arched ring-shaped tongue 22 is formed on the outer surface 24 of tube section 12. When the tube sections 10 and 12 are assembled, as shown in FIG. 2a, their longitudinal axes 14 and 16 are aligned and an annular cavity 26 is formed between the groove 18 and the surface of the tongue 22. A hardenable mass 28 made, for example, of polyvinylchlorid-foam is pressed into cavity 26 by means of a channel 30. Alternatively, a permanently elastic mass such as polyurethan-foam may be used instead of the hardenable mass. The surfaces of the groove 18 and tongue 22 are curved in such a way that a restricted degree of movement of the tube sections 10 and 12 relative to one another is possible. To permit the restricted movement tongue and groove have cross sections as the ball and socket of a joint. In the case of a hardenable elastic plastic mass the restricted degree of movement is very little.

Whereas the outer surfaces 20, 24 of tube sections 10, 12 have only a single groove and a single tongue in the embodiment shown in FIGS. 1a and 2a, the embodiment of FIGS. 1b and 2b employs one tongue 30 and two grooves 32, 34 located in the front side 20' of tube section 10' and two tongues 36, 38 and one groove 40 on the front side 24' of tube section 12'. The tongues and grooves are formed in such a way that a restricted amount of movement of the tube sections relative to one another is possible, as shown in the drawings. Furthermore, they together form a cavity 42 in which three permanently elastic clamping bands 44a, 44b and 44c are positioned at the bases of grooves 32, 34 and 40, respectively, so that the backs of the tongues 36, 38 and 30, respectively, can be pressed into these bands.

In the embodiments of both FIGS. 1a, 1b and 2a, 2b, the front surfaces 20, 20' and 24, 24' of both tube sections 10, 10' and 12, 12' are provided with ring-shaped flanges 46 and 48 which abut one another after the tube sections have been assembled. Each flange has an oblique face 50, 52 on its inner side opposite a transverse outer face 54, 56 so that the flanges are wedge-shaped in cross section and widen towards the base of the flange.

After the tube sections have been assembled, a circumferential ring 58 is placed over both flanges 46 and 48. The ring 58 has an approximately circular pipe-shaped cross section and a ring-shaped slit on its inner side through which flanges 46 and 48 pass into the inside of the ring. The side edges 60 of the ring abut the faces 50, 52 of the flanges 46, 48 and have a distance between them which is shorter than the distance between the base points 62 of the inner oblique faces 50, 52 when the tube sections are assembled.

The ring 58 is contracted by a clamping device 63 shown in FIG. 4. When this clamping action is applied, the side edges 60 slide along the oblique faces 50, 52 inwardly in the direction of the base points 62 and the tube sections 10 and 12 (FIG. 1a) and 10' and 12' (FIG. 1b) are axially pressed onto each other. A hardenable and/or permanently elastic mass 29 composed of polyvinylchlorid-foam or polyurethan-foam is pressed into the ring 58 through an opening (not shown). In the embodiment shown in FIG. 4, the ring 58 is made of two parts 58a and 58b which are held together on the side opposite the clamping device 63 by way of two hooks 64a and 64b.

After the permanently elastic mass has been pressed into the ring 58, the ring can be loosened slightly in order to increase the movement of the elements relative to one another. The clamping device, as shown in FIG. 4, can thus be mounted in two positions, sufficient tightness being provided in that case by the elastic mass.

In the embodiments of FIGS. 3a and 3b, plastic profile members 66a, 66b are inset in the front surfaces of the tube sections 68a, 68b. The plastic profile members form one groove 70 (FIG. 3a) or two grooves 72, 74 and a tongue 76 (FIG. 3b) on the side opposite the tube sections 78a, 78b. Corresponding profile members 80a, 80b are secured to the front sides of tube sections 78a, 78b which are also composed of plastic and form one tongue (FIG. 3a) or two tongues 84, 86 and a groove 88 (FIG. 3b), respectively. Profile members 66a, 66b are cemented and additionally or alternatively secured to the front sides of tube sections 68a, 68b by slots 90a, 90b in tube sections 68a, 68b and keys 92a, 92b on profile members 66a, 66b. Similarly, profile members 80a, 80b affixed to the front sides of tube sections 78a, 78b may be cemented or secured by slots 94a, 94b in tube sections 78a, 78b and keys 96a, 96b on profile members 80a, 80b. The keys 92a, 92b and 96a, 96b can be secured undetachably in the slots 90a, 90b and 94a, 94b by their snap lock action.

In FIGS. 5a, 5b and 6, the tube sections are made up of two half shells 98, 100, the grooves and tongues of which not only traverse the front surfaces but also the dividing surfaces 102, 104 between the half shells. At the corners of these shells, the tongues on the front surfaces pass into the grooves of the dividing surfaces and the grooves of the front surfaces pass into the tongues of the dividing surfaces. The transition portions from the tongues to the grooves and vice versa have an angle of 45°.

The embodiments shown in FIGS. 5a, 5b and 6 are particularly suitable for tunnel construction since the flanges 106 and 108, contrary to those of FIGS. 1 to 3, are not formed on the outsides of the tube or tunnel sections but on the inside, so that a ring 110 can be mounted from inside the flange. The ring 110 is expanded by a device such as a bolt of an eccentric cam or a lever-device e.g. with a elbow lever. A lever-device with lever 110a and 110b is shown in FIG. 11. The front surfaces of the abutting tube sections are thereby pressed together.

FIGS. 7, 8 and 9 illustrate a tube which is composed of three shells 112, 114 and 116 coupled together by axial parallel grooves and tongues. As shown in FIG. 7, each shell may have only one tongue 118 or groove 120 on the dividing surfaces or on the surfaces to be coupled together, respectively.

Referring to FIG. 10, the grooves and tongues can also be formed by rings 122, 124 mounted on the front sides of the tubes 126, 128 or by ring segments in accordance with the division of the tube into shells. A sealing mass 130 is introduced between these rings or ring segments and the front sides of the tubes. The rings 122, 124 or ring segments encircle the tubes 126, 128 laterally and are lockingly secured by saw tooth projections to the tube jackets. This may be accomplished by providing the tube jacket with a saw tooth ring 132 which projects outwards and engages a correspondingly shaped groove 134 of the ring 124. Alternatively, the ring 122 may have a ring-shaped projection 136 on the inside which locks into an annular groove 138 on the outside of the tube jacket. The ring-shaped projection 136 is undercut so as to resiliently bend in a backward direction. The saw tooth shaped groove 138 can be easily milled by hand into the outside of the tube at the assembly point. Also, tongues 140 and elastic clamping bands 142 are provided in this embodiment.

The grooves and tongues can be round in cross section in all embodiments, thereby enhancing the centering effect.

It is to be understood that the above description of the present invention is susceptible to various modifications, changes and adaptations, and the same are intended to be comprehended within the meaning and range of equivalents of the appended claims.

What is claimed is:

1. A hollow body assembly comprising:
    at least first and second individual elements, having longitudinal axes, adapted for connecting together to form said hollow body, at least one of said elements having a tongue on its connecting surface and the other element having a groove on its connecting surface for mating with said tongue thereby forming an annular cavity between said tongue and the surface of said groove when said individual elements are connected, the axial distance between said tongue and the surface of said groove being greater near the center of said tongue than at the edges thereof;
    first and second circumferential flanges disposed on said first and second elements, respectively, at said connecting surfaces, each of said flanges having a transverse outer face perpendicular to said longitudinal axis and an inner face, said inner face being oblique to said transverse direction so that the width of said flange in the axial direction increases toward the base of said flange; and
    a circumferential ring surrounding said first and second flanges and having an inner channel, said ring having side edges for gripping the oblique surfaces of said first and second flanges when said first and second elements are connected, the distance between said side edges when said ring is in its unstressed condition being less than the distance between the base points of the oblique surfaces of the flanges.

2. A hollow body assembly according to claim 1 which further comprises a clamping device attached to said circumferential ring for tightening said ring about the outer surfaces of said individual elements.

3. A hollow body assembly according to claim 1 wherein said circumferential flanges are on the inner surfaces of said individual elements and said ring abuts said inner surfaces, said ring being expandable by a pressure device.

4. A hollow body assembly according to claim 1 wherein said circumferential ring comprises at least two parts, said parts having engaging portions for securing said parts to each other.

5. A hollow body assembly according to claim 4 wherein said engaging portions comprise hooks.

6. A hollow body assembly according to claim 1 wherein said annular cavity is filled with a mass.

7. A hollow body assembly according to claim 6 wherein said mass is permanently elastic.

8. A hollow body assembly according to claim 1 or 6 which further comprises at least one elastic clamping band interposed between said tongue and the surface of said groove.

9. A hollow body assembly according to claim 8 wherein said elastic band is positioned within said groove and said tongue is pressed into contact with said band.

10. A hollow body assembly according to claim 1 wherein said individual elements include profile members affixed thereto, said profile members having said groove and tongue formed therein.

11. A hollow body assembly according to claim 10 wherein each of said profile members is provided with a key for engaging within a groove in a corresponding individual element, said profile members being thereby secured to said corresponding individual element.

12. A hollow body assembly according to claim 10 or 11 wherein said profile members are composed of an elastic material.

13. A hollow body assembly according to claim 1 wherein each of said individual elements is longitudinally divided to form at least two shells.

14. A hollow body assembly according to claim 13 wherein said shells have transverse front and longitudinal dividing surfaces provided with grooves and tongues, the tongues on the front surfaces of said shells passing into the grooves of said dividing surfaces and the grooves of said front surfaces passing into the tongues of said dividing surfaces.

15. A hollow body assembly according to claim 14 wherein the transition portions from said tongues to said grooves extends at an angle of 45° with respect to said dividing surface.

16. A hollow body assembly according to claim 13 or 14 wherein the joints between longitudinally abutting shells are not in alignment.

17. A hollow body assembly according to claim 1 which comprises at least two annular ring segments secured to the front surface of said individual elements, said ring segments including said tongues, grooves and circumferential flanges.

18. A hollow body assembly according to claim 17 wherein said ring segments laterally encircle said individual elements, said ring segments being secured to said elements by saw tooth projections.

19. A hollow body assembly according to claim 18 wherein said saw tooth projection is undercut and locks into a correspondingly shaped groove on said element.

* * * * *